Figure 1:
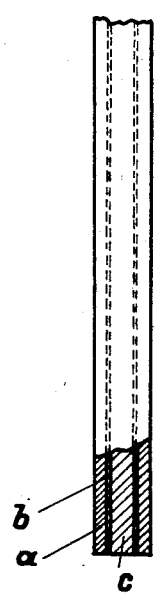

Jan. 15, 1929.   H. A. MEINHARDT   1,699,438

SOLDERING STICK

Filed Aug. 25, 1927

Inventor:

Hermann A. Meinhardt

Patented Jan. 15, 1929.

1,699,438

UNITED STATES PATENT OFFICE.

HERMANN A. MEINHARDT, OF BAD GODESBERG, GERMANY.

SOLDERING STICK.

Application filed August 25, 1927, Serial No. 215,467, and in Germany December 10, 1926.

My invention relates to soldering sticks, and especially to soldering sticks consisting of a tubular or foliform casing or barrel of soft solder, containing soft soldering metal and other soldering agents as a core. My invention consists in the soft soldering metal of the core having a higher fusing point than that of the barrel.

In soldering sticks already known in which a tubular casing is filled with a previously prepared soft soldering mass of pulverized soft solder and other soldering agents, the soft soldering mass of the filling is either to be fused more quickly or at a lower temperature than the tin-solder of the casing. Its mode of manufacture on account of it having to be suited to the above-mentioned fusing properties of the metals contained in the filling, is complicated, difficult, and expensive. If, for instance, in these known soldering-sticks an alloy is used as filling which fuses at a lower temperature than the barrel, it often happens, in particular in tubular soldering sticks of wide cross-section and correspondingly large filling quantities, that by overheating large amounts of the filling fall out, not only while the soldering work is going on but after finishing the work and removing the source of heat. In this manner empty tube ends are produced which can no longer be used unless refilled with solder and soldering agents.

In contrast to the above, the soldering sticks in accordance with my invention, in which, for instance, a core or filling of crushed soft solder and other soldering agents is used, have the advantage that they can be turned out and filled at considerably less expense, namely by choosing for the core soldering alloys with so high a fusing point that they no longer melt at the temperatures necessary for making the tubular casing, the soldering stick thus remaining suitable for further treatment. The new soldering sticks are further not attended by the drawbacks of excessive falling out of portions of the core during heating or of untimely or detrimental losses of the core after removing the source of heat on finishing the soldering work in hand. This advantage is obtained by using a soldering alloy for the core which hardens at a higher temperature than the soldering metal of the barrel, the fusing or hardening point of which is lower. In this manner the occurrence of utilizable soldering stick ends is avoided and the production of high class spot-soldering facilitated.

The invention does not relate exclusively to the use of previously prepared soft soldering masses as a core, but to such fillings as well which contain the soft solder alloys and agents in other form, as for instance, solid wire with a solder coating, or as a tube filled with soldering alloy.

Figure 3:
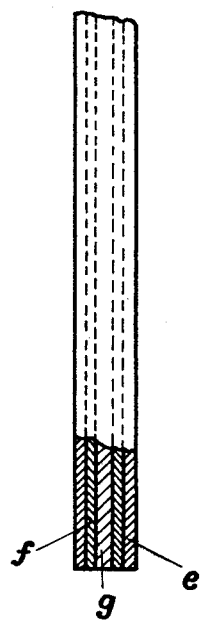
Figure 2:
Figure 4:
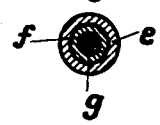

Embodiments of my invention are illustrated in the drawings which form a part of this application, and in which Fig. 1 shows a soldering stick in elevation and partly in section, while Fig. 2 is a cross-sectional view, Figs. 3, and 4 show a modified structure in elevation, partly in section, and in cross-section respectively.

Referring to Figs. 1 and 2 the soldering stick consists of an outer tubular casing $a$ of soldering metal and a wire-like core $c$ of a solder alloy having a higher fusing point than the casing $a$; the solder alloy core $c$ carrying a coating of a suitable soldering or fluxing agent $b$.

The soldering stick according to Figs. 3, and 4 consists of an outer tube $i$ of soldering metal, and an inner tube $f$ of solder alloy; said inner tube $f$ being filled with a suitable soldering agent $g$ or a mixture of soldering agents; the inner tube $f$ having a higher fusing point than the outer tube $i$.

What I claim as my invention and desire to secure by Letters Patent of the United States is:—

1. A soldering stick, consisting of an outer casing of soldering metal, a core of soldering metal and a fluxing agent carried by said core, said core having a higher fusing point than said casing.

2. A soldering stick, comprising, in combination, an outer casing of soldering metal, a core of soldering metal therein, said core having a higher fusing point than said casing, and a fluxing agent within said casing.

3. A soldering stick, consisting of a tubular casing of soldering metal, another tube of soldering metal having a higher fusing point than said tubular casing and being disposed within said tubular casing, and a filling consisting of a suitable fluxing agent within said inner tube.

HERMANN A. MEINHARDT.